United States Patent [19]
Koelling

[11] Patent Number: 5,711,195
[45] Date of Patent: Jan. 27, 1998

[54] APPARATUS AND METHOD FOR PRECISION MACHINING OF METAL RINGS

[76] Inventor: Robert Koelling, 8342 San Fernando Way, Dallas, Tex. 75218

[21] Appl. No.: 549,479

[22] Filed: Oct. 27, 1995

[51] Int. Cl.⁶ .................. B23B 1/00; B23B 31/00
[52] U.S. Cl. ............... 82/1.11; 29/559; 269/104; 279/110
[58] Field of Search ............... 82/1.11, 165, 168, 82/169; 409/165, 219, 225; 279/2.01, 110, 139; 269/47, 48.1, 99, 104; 29/22 R, 889.2, 889.3, 559, 557; 144/28.8, 28.9, 4.1–4.8

[56] References Cited

U.S. PATENT DOCUMENTS

| | | | |
|---|---|---|---|
| 368,693 | 8/1887 | Taylor | 279/2.01 |
| 1,893,267 | 1/1933 | Bickel | 279/139 |
| 2,703,242 | 3/1955 | Sloan et al. | 279/139 |
| 3,026,746 | 3/1962 | Mueller et al. | 409/165 |
| 3,604,717 | 9/1971 | Hohwart | 279/139 |
| 4,575,911 | 3/1986 | Laszlo | 29/559 |
| 4,930,955 | 6/1990 | Kawano et al. | 402/225 |

*Primary Examiner*—Daniel W. Howell
*Attorney, Agent, or Firm*—Winstead, Sechrest & Minick, P.C.

[57] ABSTRACT

There is disclosed an apparatus for machining large diameter, thin-walled steel rings to precise tolerances. A ring of metal stock is placed within the jaws of a group of screw-type clamps located on a flat lathe faceplate. The clamps are evenly spaced around the ring of metal stock and each contains one or more pairs of opposing screws. The clamp screws are slowly advanced until the screws gently touch the inner surface and outer surface of the metal stock ring. The opposing screws are then gradually tightened until the ring of metal stock is locked in place. The equal and opposite forces exerted by the opposing screws hold the metal stock rigidly in place without inducing mechanical stresses in the ring that would otherwise warp the ring while it was mounted on the lathe faceplate.

17 Claims, 5 Drawing Sheets

APPARATUS AND METHOD FOR PRECISION MACHINING OF METAL RINGS

TECHNICAL FIELD OF THE INVENTION

This invention relates to an apparatus and method for machining metal rings and, in particular, to an apparatus and method for machining thin wall, large diameter steel turbine rings on a lathe without inducing stress in the metal.

BACKGROUND OF THE INVENTION

Lathing machines are widely used to machine metal rings of varying diameters. Many state-of-the-art technologies require that metal rings be machined to very precise diameters. This is particularly true of turbine engines, which frequently contain thin wall, large diameter steel rings that must be machined to within thousandths of an inch of a specified diameter. Modern turbine engines use turbine rings and turbine blades of precise tolerances in order to minimize air turbulence through the engine and thereby maximize energy efficiency.

Traditional methods of machining to a precise tolerance are limited in accuracy due to stresses that are induced in the metal stock by the lathing apparatus used to hold the stock in place. FIG. 2 depicts the typical three jaw chuck 201 used to hold metal stock ring 20 in place for machining. Each jaw 201a–c of three jaw chuck 201 moves in concert with the other jaws. Metal stock ring 20 is placed in the three jaw chuck 201 in a "relaxed" state, one in which no mechanical stress is induced by external forces from three jaw chuck 201. In a relaxed state, metal stock ring 20 is substantially aligned with the perfect circle shown as a dotted line in FIG. 2.

Next, three jaw chuck 201 is tightened against metal stock ring 20. The applied mechanical forces induce mechanical stress in metal stock ring 20 and cause it to bulge as shown in FIG. 2. Metal stock ring 20 is then machined in this mechanically stressed state into a circular ring that is within the required precision. However, when three jaw chuck 201 is opened, the induced mechanical stress is released and metal stock ring 20 springs back to its relaxed state. The finished steel ring is no longer "perfectly" circular and must be bent back within tolerance when installed in a turbine engine during final assembly. This procedure is costly and imperfect.

The foregoing problem is particularly exacerbated when the finished steel ring is relatively thin-walled. To minimize waste, a thinner ring of metal stock generally is used to make a thin-walled finished product. The thin-walled metal stock will experience greater amounts of bulge than a thicker ring of metal stock ring when three jaw chuck 201 is tightened.

There is therefore a need for an apparatus and method for lathing steel rings of various thicknesses without inducing mechanical stresses in the metal stock.

In particular, there is a need for a lathe mounting apparatus which can be tightened against a ring of metal stock without causing the metal stock to warp or bulge due to the induced mechanical stresses.

SUMMARY OF THE INVENTION

According to a first embodiment of the present invention, an apparatus for lathing a circular ring of metal stock is provided comprising a mounting fixture for rotating the metal stock and a plurality of clamping devices disposed on the mounting fixture for holding the metal stock. Each of the clamping devices exerts opposing forces on the inside surface and the outside surface of the circular ring of metal stock to thereby hold the metal stock rigidly in place without inducing stress in the metal stock.

According to a second embodiment of the present invention, an apparatus for lathing a circular ring of metal stock is provided comprising a rotatable faceplate having a plurality of slots therethrough and a plurality of clamps slidably mounted in the slots. Each of the clamps has an inside screw for tightening against an inside surface of the circular ring and an outside screw for tightening against an outside surface of the circular ring to thereby hold the metal stock rigidly in place without inducing stress in the metal stock.

In a further embodiment of the present invention, a method of mounting a circular ring of metal stock on a rotatable faceplate is disclosed wherein a plurality of clamps slidably mounted on the rotatable faceplate are positioned at a selected distance away from the axis of rotation of the faceplate approximately equal to the radius of the circular ring of metal stock. The metal stock is then mounted on the clamps such that the center of the circular ring is positioned approximately at the axis of rotation of the faceplate. The metal stock is then fastened rigidly in place by tightening opposing screws in each clamp. The opposing screws are first gently tightened against the inside surface and the outside surface of the metal stock and each are then further tightened in alternating, incremental amounts.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF THE INVENTION

Figure 1:
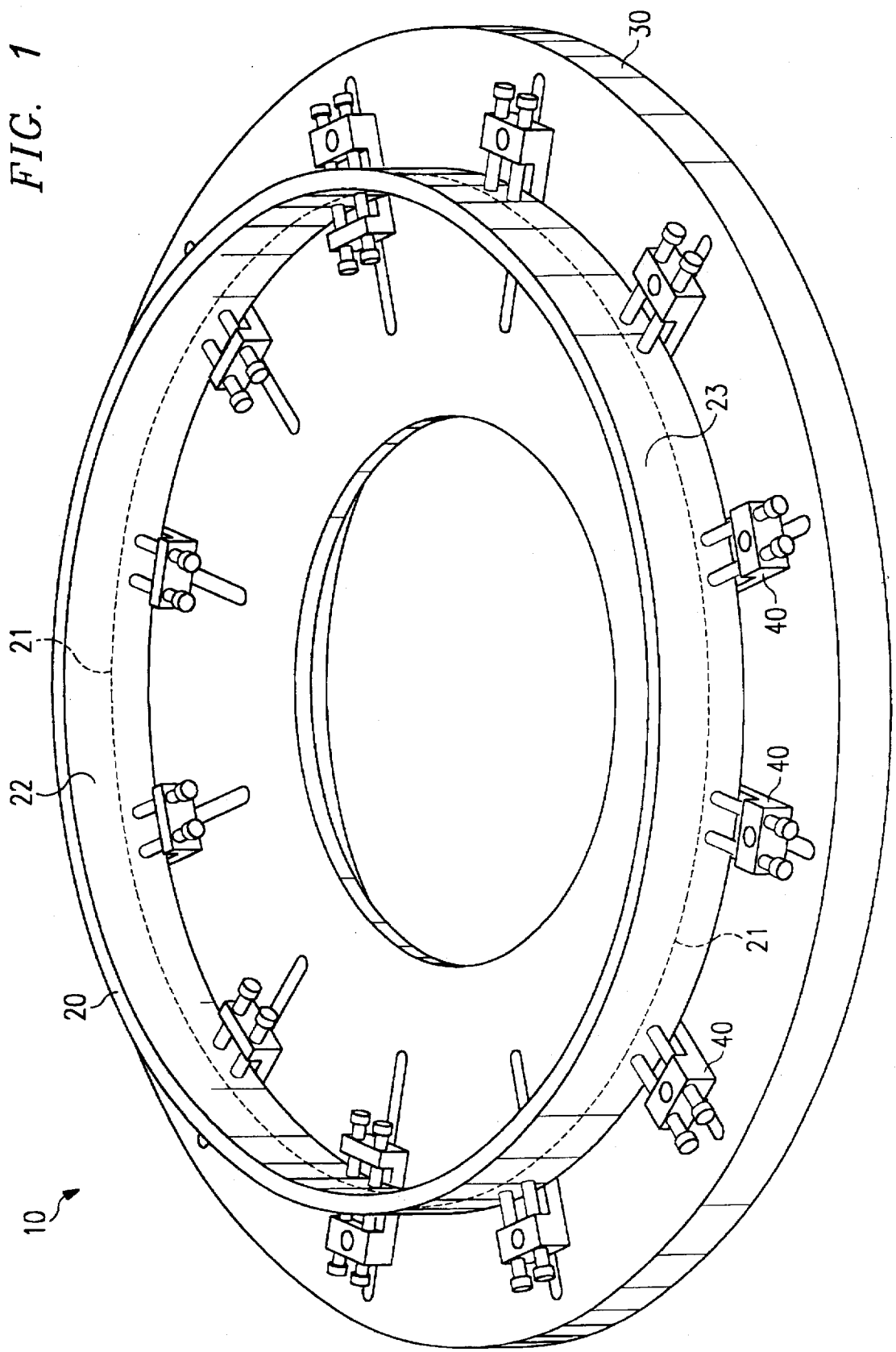
FIG. 1 is a perspective view of a lathing apparatus in accordance with one embodiment of the present invention.
Figure 2:
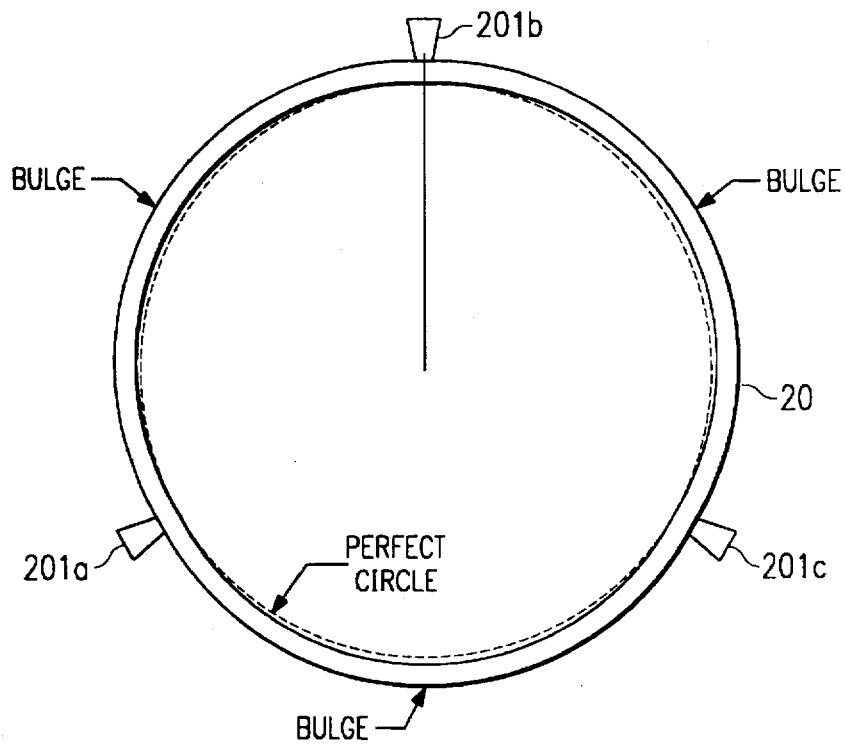
FIG. 2 is a top view of a three jaw chuck lathing apparatus in accordance with the prior art.

FIG. 1 depicts metal stock ring 20 mounted on a lathe apparatus 10 in accordance with the present invention. Lathe apparatus 10 comprises lathe faceplate 30 and a plurality of clamps 40 for holding metal stock ring 20 in place while a lathe motor (not shown) turns faceplate 30. Dotted line 21 delineates the boundary between the portion of metal stock ring 20 below dotted line 21 which is not machined by the lathing tool (not shown) and inner surface 22 and outer surface 23 of metal stock ring 20 which are machined by the lathing tool. Clamps 40 are fastened to the portion of metal stock ring 20 below dotted line 21 which is not machined.

Figure 3A:
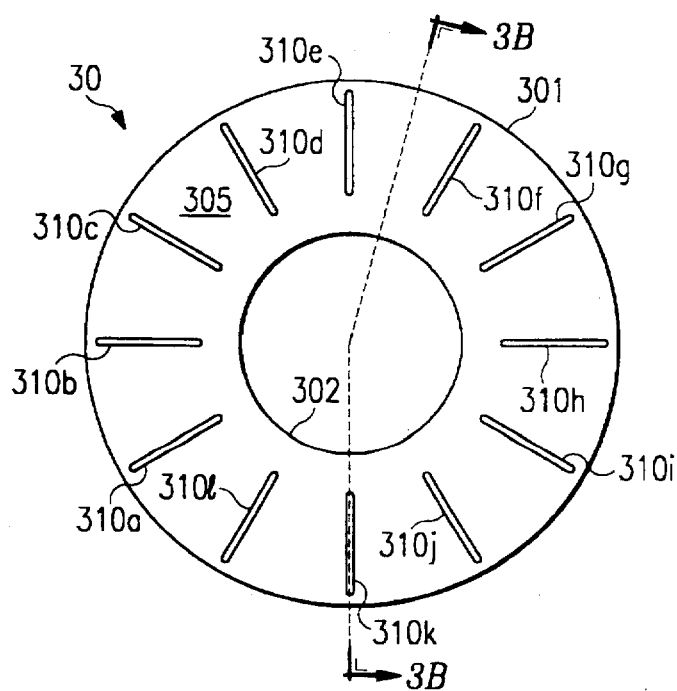
FIG. 3A is a top view of the lathe faceplate in accordance with the present invention.
Figure 3B:
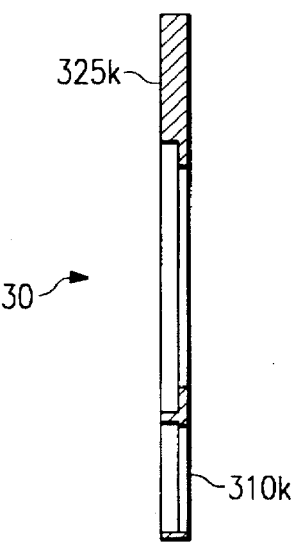
FIG. 3B is a cross-sectional view of the lathe faceplate in accordance with the present invention.
Figure 3C:
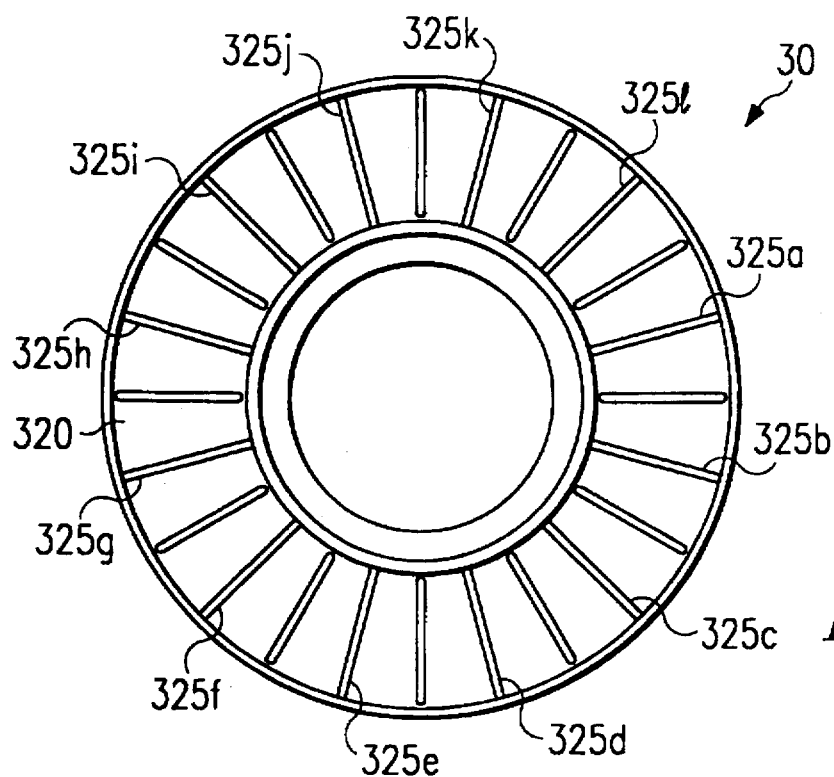
FIG. 3C is a bottom view of the lathe faceplate in accordance with the present invention.

As FIG. 1 shows, clamps 40 press against the inside surface and the outside surface of metal stock ring 20 at opposing points in order to prevent the "bulging" effect inherent in the prior art three jaw chuck 201. As FIGS. 3A–3B show, faceplate 30 contains a plurality of slots 310a–310l in upper surface 305. Slots 310a–310l are interspersed between ribs 325a–325l on the bottom surface of faceplate 30. Inner diameter 302 and outer diameter 301 of faceplate 30 are sufficiently large to accommodate most commercial turbine rings, typically ranging between 35 inches and 90 inches in diameter.

Figure 4:
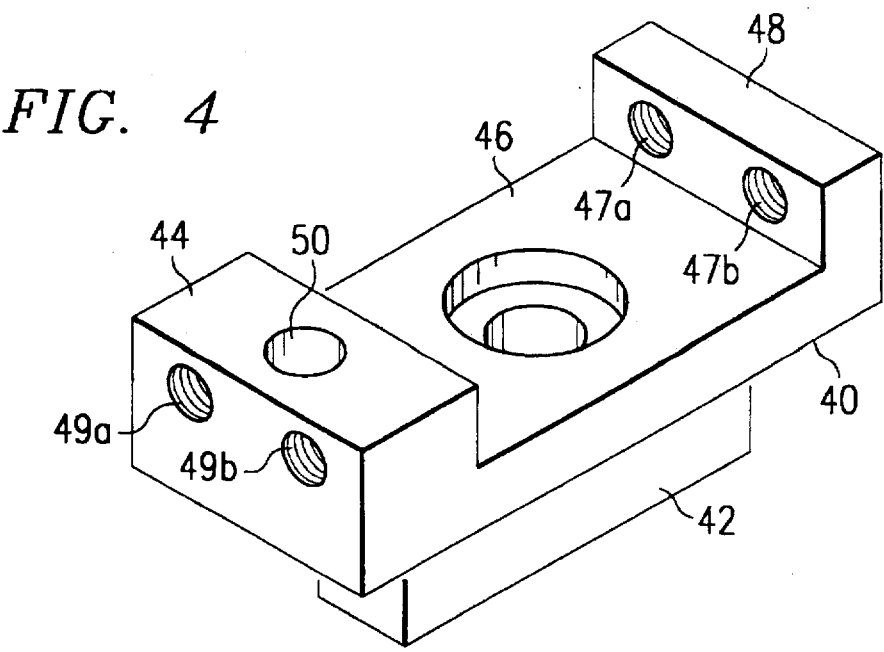
FIG. 4 is a perspective view of a clamp in accordance with the present invention.
Figure 5A:
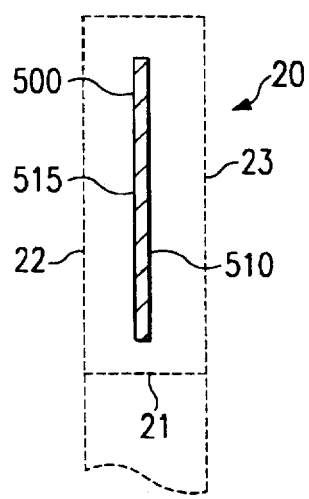
FIGS. 5A, 5B, 5C, 5D, and 5E are cross-sectional views of turbine rings in accordance with the teachings of the present invention.
Figure 5B:
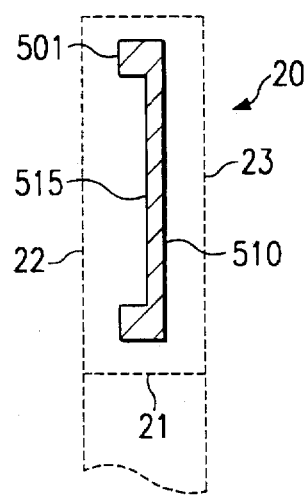
Figure 5C:
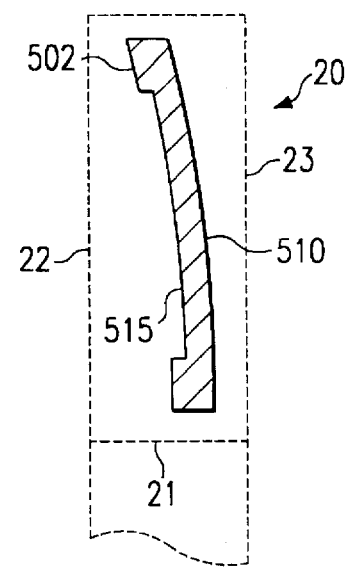
Figure 5D:
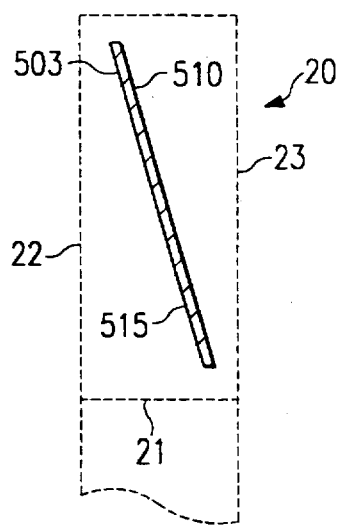
Figure 5E:
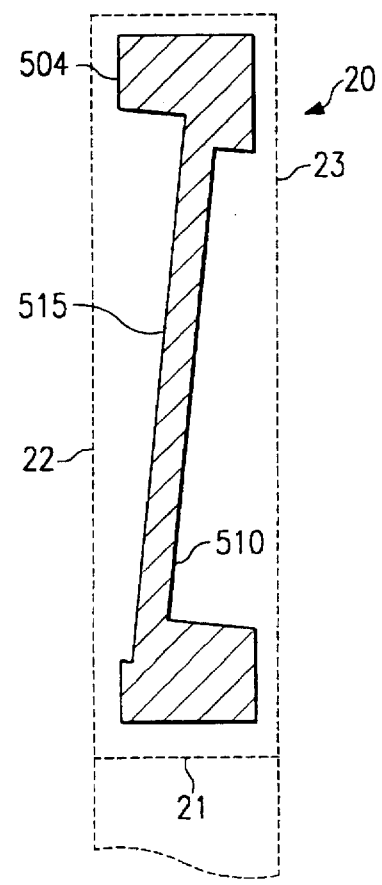

FIG. 4 depicts clamp 40, which inserts into any one of the slots 310a–310l in faceplate 30. Metal stock ring 20 is placed on mounting surface 46 of clamp 40. Screw holes 49a and 49b are drilled through outer jaw 44 and screw holes 47a and 47b inner jaw 48 of clamp 40. Bore hole 50 in outer jaw 44 of clamp 40 is used to align a shroud-stiffener ring, as explained below in greater detail. Clamp 40 is mounted in slot 310 using guide 42.

Initially, clamps 40 are moved in slots 310a–310lon faceplate 30 such that mounting surface 46 of each clamp 40 is positioned at the correct radial distance away from the center point of faceplate 30 in order to receive metal stock ring 20. Clamps 40 may be independently positionable or may move in concert through a common mechanical drive mechanism. When metal stock ring 20 is placed on mounting surfaces 46 of clamps 40, an alignment device positioned at a selected measurement point records the location of either inner surface 22 or outer surface 23 of metal stock ring 20 to determine how far away from the center of faceplate 30 that part of metal stock ring 20 is. Faceplate 30 is then rotated slowly while the alignment device continually determines how far off-center the part of metal stock ring 20 passing by the alignment device is. As metal stock ring 20 is rotated, the lathe operator gently taps metal stock ring 20 at the measurement point in order to move metal stock ring 20 towards or away from the center of faceplate 30. In this manner, metal stock ring 20 is continually realigned until metal stock ring 20 is concentrically located around the center point of faceplate 30 to within a few tenths or hundredths of an inch, or as close as practicable.

Next, the screws in screw holes 49a and 49b of outer jaw 44 and the screws in screw holes 47a and 47b of inner jaw 48 of each clamp 40 are slowly advanced until the ends of the screws barely touch metal stock ring 20. At this point, metal stock ring 20 is still in a relaxed state, while all of the screws in clamps 40 are in slight contact with metal stock ring 20. The lathe operator then slowly tightens opposing screws in each clamp 40 so that metal stock ring 20 is gradually locked into position in a relaxed state by each clamp 40 in faceplate 30.

Since the screws exert an equal and opposite force on each side of metal stock ring 20, metal stock ring 20 is not warped by the mechanical forces exerted by the screws. Although FIGS. 1 and 4 depict two pairs of opposing screws in each clamp 40, in alternate embodiments of the present invention, a single pair of opposing screws may be used in each clamp 40.

Another technical advantage of the present invention over the three jaw chuck 201 of the prior art is the use of a large number of evenly spaced clamps 40 to hold metal stock ring 20. FIGS. 1 and 3A depict the use of twelve clamps 40 disposed in twelve slots 310a–310l, each spaced 30° apart in faceplate 30. Three jaw chuck 201 of the prior art has 120° of unsupported metal stock ring 20 between each jaw of the chuck. This unsupported arc of metal may itself be slightly bent by the pressure of the lathing tool. This in turn reduces the precision to which a ring may be machined.

In contrast, the present invention allows no more than 30° of arc of metal stock ring 20 to be unsupported. This reduces any error in the lathing process caused by pressure from the lathing tool. Experimentation with different configurations of the present invention demonstrates that a minimum of 8 clamps, each spaced 45° apart, should be used in order to properly support metal stock ring 20. In a preferred embodiment of the present invention, twelve clamps spaced 30° apart are used.

FIGS. 5A–5E are cross-sectional views of turbine rings 500–504 disposed within an outline of metal stock ring 20. In a preferred embodiment of the present invention, outer surface 23 of metal stock ring 20 above dotted line 21 is machined first by the lathing tool. When outer surfaces 510 of turbine rings 500–504 have been reached, the lathing tool is switched to the inside of metal stock ring 20 and inner surface 22 of metal stock ring 20 is cut above dotted line 21 until inner surfaces 515 of turbine rings 500–504 are reached.

In cases where the finished turbine ring is exceedingly thin, such as in turbine rings 500–503, shroud-stiffener rings 600 such as those depicted in FIGS. 6A–6D, are used to support outer surfaces 510 of turbine rings 500–503 while inner surface 22 of metal stock ring 20 is being machined. Shroud-stiffener ring 600 prevents turbine rings 500–503 from bending due to the pressure of the lathing tool as metal stock ring 20 becomes thinner and thinner. Shroud-stiffener ring 600 is placed around the exterior of metal stock ring 20 and rests upon the top of outer jaw 44 of clamps 40.

Shroud-stiffener ring 600 is slightly larger in diameter than outer surfaces 510 of finished turbine rings 500–503 due to gap 610 in shroud-stiffener ring 600. Gap 610 allows shroud-stiffener ring 600 to open slightly in order to be mounted around partially lathed turbine rings 500–503. Alignment holes 605a–605l are aligned with bore holes 50 in the top of clamps 40. A tightening clamp (not shown) is then inserted into holes 615a and 615b of shroud-stiffener 600 and tightened until gap 610 in shroud-stiffener 600 is narrowed. This tightens inner surfaces 601 of shroud-stiffener 600 against outer surfaces 510 of the partially lathed steel turbine rings 500–503.

Figure 6A:
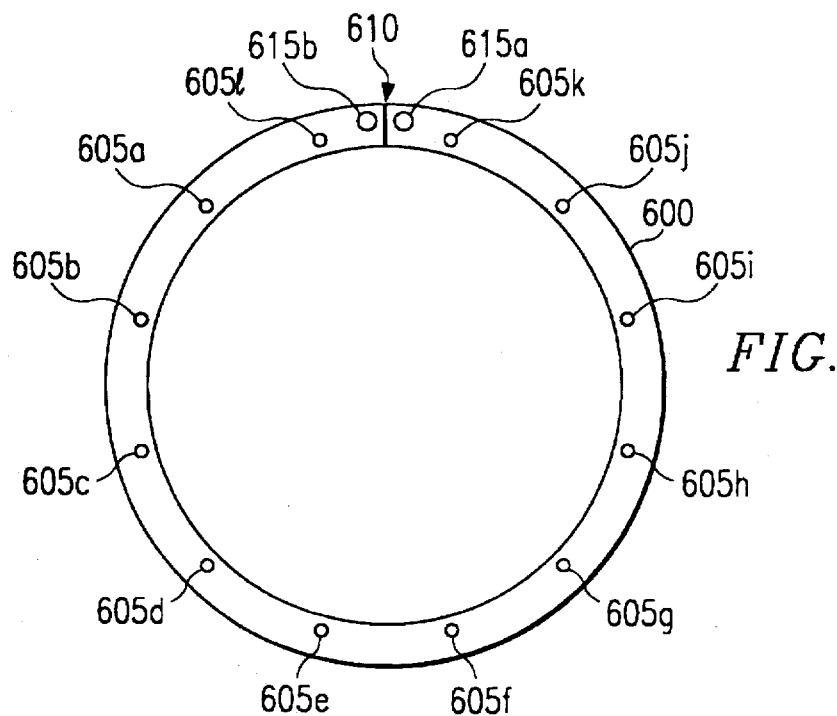
FIGS. 6A, 6B, 6C, and 6D are top and cross-sectional views of a shroud-stiffener ring in accordance with the present invention.
Figure 6B:
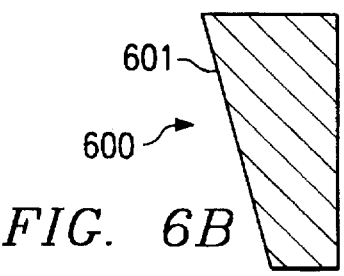
Figure 6C:
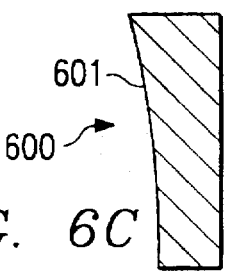
Figure 6D:
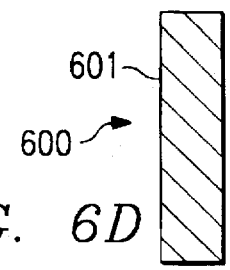

Inner surface 601 of shroud-stiffener ring 600 is shaped to accommodate outer surface 510 of the turbine ring being lathed. For example, shroud-stiffener ring 600 shown in cross-section in FIG. 6B is used to reinforce steel turbine ring 503. Shroud-stiffener ring 600 shown in cross-section in FIG. 6C is used to reinforce steel turbine ring 502. Shroud-stiffener ring 600 shown in cross-section in FIG. 6D is used to reinforce either steel turbine ring 500 or steel turbine ring 501.

After shroud-stiffener ring 600 is tightened in place, the lathing tool is then used to cut inner surface 22 of metal stock ring 20 until steel turbine ring 500–503 is finished. Larger, thicker steel turbine rings, such as steel turbine ring 504 in FIG. 5E generally do not require reinforcement from a shroud-stiffener ring.

The top edges of steel turbine rings 500–504 are generally cut by the lathing tool before lathing the rest of the turbine rings. The bottom edge of the steel turbine ring is generally cut last in order to separate the finished steel turbine ring from the waste portion of metal stock ring 20 below dotted line 21.

Although the present invention and its advantages have been described in detail, it should be understood that various changes, substitutions and alterations can be made herein without departing from the spirit and scope of the invention as defined by the appended claims.

What is claimed is:

1. An apparatus for holding a ring of metal stock during lathing, comprising:
    a mounting fixture for mounting said metal stock during rotation; and
    a plurality of clamping devices slidably connected to said mounting fixture, each of said plurality of clamping devices independently positionable along a radius of said mounting fixture, each of said plurality of clamping devices exerting a first force on an inside surface of said metal stock and a second force opposing said first force on an outside surface of said metal stock, wherein said first and said second forces exerted by each of said plurality of clamping devices are independently adjustable, to thereby hold said metal stock rigidly in place in its original curved shape without inducing stress in said metal stock or deforming the curvature of said metal stock as it is secured rigidly in place.

2. The apparatus as set forth in claim 1 wherein each said clamping device includes screws for exerting said first forces and second force on said metal stock.

3. The apparatus as set forth in claim 1 wherein said plurality of clamping devices comprises at least eight clamping devices.

4. The apparatus as set forth in claim 1 wherein said plurality of clamping devices comprises twelve clamping devices.

5. The apparatus as set forth in claim 1 wherein said plurality of clamping devices are disposed along a circumference of said metal stock at substantially equal intervals.

6. An apparatus for holding a circular ring of metal stock during lathing comprising:
    a faceplate rotatable about a central axis for mounting said metal stock during lathing, said faceplate having a plurality of slots therethrough; and
    a plurality of clamps slidably mounted in said plurality of slots, each of said clamps independently positionable along a radius of said faceplate, each of said clamps having a first screw for tightening said clamp against an inside surface of said metal stock and a second screw opposing said first screw for tightening said clamp against an outside surface of said metal stock, wherein said first screw and said second screw are independently adjustable, to thereby hold said metal stock rigidly in place in its original curved shape without inducing stress in said metal stock or deforming the curvature of said metal stock as it is secured rigidly in place.

7. The apparatus as set forth in claim 6 wherein plurality of clamps comprises at least eight clamps.

8. The apparatus as set forth in claim 6 wherein plurality of clamps comprises twelve clamps.

9. The apparatus as set forth in claim 6 wherein said plurality of clamps are disposed along a circumference of said metal stock at substantially equal intervals.

10. A method of mounting a circular ring of metal stock for lathing, the method comprising the steps of:
    positioning said circular ring of metal stock in a first position on a plurality of independently positionable clamps disposed on a rotatable mounting plate such that a center of said circular ring of metal stock is positioned approximately at said axis of rotation of said mounting plate;
    tightening an inside screw of a selected one of said plurality of clamps against an inside surface of said circular ring of metal stock such that said inside screw minimally contacts said inside surface, wherein said circular ring remains in said first position;
    tightening an outside screw of said selected clamp against an outside surface of said circular ring of metal stock such that said outside screw minimally contacts said outside surface, wherein said circular ring remains in said first position; and
    further tightening said inside screw and said outside screw of said selected clamp.

11. The method as set forth in claim 10 including the further steps of:
    rotating said mounting plate; and
    lathing said circular ring of metal stock.

12. The method as set forth in claim 10 including the further steps of:
    tightening inside screws of all remaining clamps against said inside surface of said circular ring of metal stock such that each of said inside screws minimally contacts said inside surface;
    tightening outside screws of all remaining clamps against said outside surface of said circular ring of metal stock such that each of said outside screws minimally contacts said outside surface; and
    further tightening said inside screws and said outside screws of said remaining clamps until said metal stock is held rigidly in place.

13. The method as set forth in claim 12 including the further steps of:
    rotating said mounting plate; and
    lathing said circular ring of metal stock.

14. A method of mounting a circular ring of metal stock for lathing, the method comprising the steps of:
    positioning said circular ring of metal stock on a plurality of clamps disposed on a rotatable mounting plate such that a center of said circular ring of metal stock is positioned approximately at said axis of rotation of said mounting plate;
    tightening an inside screw of a selected one of said plurality of clamps against an inside surface of said circular ring of metal stock such that said inside screw minimally contacts said inside surface;
    tightening an outside screw of said selected clamp against an outside surface of said circular ring of metal stock such that said outside screw minimally contacts said outside surface;
    further tightening said inside screw and said outside screw of said selected clamp;
    tightening inside screws of all remaining clamps against said inside surface of said circular ring of metal stock such that each of said inside screws minimally contacts said inside surface;

tightening outside screws of all remaining clamps against said outside surface of said circular ring of metal stock such that each of said outside screws minimally contacts said outside surface;

further tightening said inside screws and said outside screws of said remaining clamps until said metal stock is held rigidly in place;

rotating said mounting plate;

lathing said outside surface of said circular ring of metal stock;

tightening a stiffening ring against said lathed outside surface of said circular ring of metal stock to thereby support said circular ring of metal stock; and lathing said inside surface of said circular ring of metal stock.

15. A method of mounting rounded ring of metal stock on a lathe, said lathe comprising a rotatable mounting plate and a plurality of clamps disposed thereon, the method comprising the steps of:

placing said rounded ring of metal stock on said plurality of clamps in a first position;

tightening an inside screw of a first clamp against an inside surface of said rounded ring of metal stock such that said inside screw minimally contacts said inside surface;

tightening an outside screw of said first clamp against an outside surface of said rounded ring of metal stock such that said outside screw minimally contacts said outside surface; and further tightening said inside screw and said outside screw of said first clamp such that said rounded ring remains in said first position.

16. The method as set forth in claim 15 including the further steps of:

tightening inside screws of all remaining clamps against said inside surface of said rounded ring of metal stock such that each of said inside screws minimally contacts said inside surface;

tightening outside screws of all remaining clamps against said outside surface of said rounded ring of metal stock such that each of said outside screws minimally contacts said outside surface; and further tightening said inside screws and said outside screws of said remaining clamps until said rounded ring of metal stock is held rigidly in place such that said rounded ring remains in said first position.

17. The method as set forth in claim 16, wherein each of said clamps is independently adjustable along a radius of said mounting plate, further including the step of positioning each of said clamps approximately at a first selected distance away from said axis of rotation of said mounting plate, said first selected distance being substantially equal to a radius of said rounded ring of metal stock.

* * * * *